(12) United States Patent
Tsai et al.

(10) Patent No.: US 10,673,481 B1
(45) Date of Patent: Jun. 2, 2020

(54) ELECTRONIC MODULATING DEVICE

(71) Applicant: InnoLux Corporation, Miao-Li County (TW)

(72) Inventors: Tsung-Han Tsai, Miao-Li County (TW); Kuan-Feng Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/188,417

(22) Filed: Nov. 13, 2018

(51) Int. Cl.
*H04B 1/02* (2006.01)
*H04B 1/40* (2015.01)

(52) U.S. Cl.
CPC ..................... *H04B 1/40* (2013.01)

(58) Field of Classification Search
CPC ....... H04B 1/40; G06F 3/0443; G06F 3/0445; H04Q 21/0025
See application file for complete search history.

(56) References Cited

U.S. PATENT DOCUMENTS

| 2004/0196241 | A1* | 10/2004 | Lee | G09G 3/3655 345/94 |
| 2005/0264732 | A1* | 12/2005 | Matsushima | G02F 1/133555 349/117 |
| 2016/0085375 | A1* | 3/2016 | Park | G06F 3/044 345/174 |

* cited by examiner

*Primary Examiner* — Tuan Pham
(74) *Attorney, Agent, or Firm* — McClure, Qualey & Rodack, LLP

(57) ABSTRACT

An electronic modulating device is provided. The electronic modulating device includes a substrate, a plurality of first modulating electrodes disposed on the substrate, and a plurality of second modulating electrodes disposed on the substrate. The area of one of the first modulating electrodes is greater than the area of one of the second modulating electrodes. The ratio of the number of first modulating electrodes to the number of second modulating electrodes is in a range from 0.5 to 2.0.

13 Claims, 12 Drawing Sheets

ELECTRONIC MODULATING DEVICE

BACKGROUND

Technical Field

The present disclosure relates to an electronic modulating device, and in particular it relates to an electronic modulating device that includes modulating electrodes with different areas.

Description of the Related Art

Electronic products that include a display panel, such as smartphones, tablets, notebooks, monitors, and TVs, have become indispensable necessities in modern society. With the flourishing development of such portable electronic products, consumers have high expectations regarding the quality, functionality, and price of such products. Some of the electronic products are provided with communications capabilities such as antenna devices.

Although existing electronic modulating devices have been adequate for their intended purposes, they have not been entirely satisfactory in all respects. Therefore, up to the present, there are still some problems that can be improved in the technology behind electronic modulating devices.

SUMMARY

In accordance with some embodiments of the present disclosure, an electronic modulating device is provided. The electronic device includes a substrate, a plurality of first modulating electrodes disposed on the substrate, and a plurality of second modulating electrodes disposed on the substrate. The area of one of the first modulating electrodes is greater than the area of one of the second modulating electrodes. The ratio of the number of first modulating electrodes to the number of second modulating electrodes is in a range from 0.5 to 2.0.

In accordance with some other embodiments of the present disclosure, an electronic modulating device is provided. The electronic device includes a substrate, a plurality of first modulating electrodes disposed on the substrate, a plurality of second modulating electrodes disposed on the substrate, and a common electrode disposed opposite to the plurality of first modulating electrodes and the plurality of second modulating electrodes. The first overlapping area formed between the common electrode and one of the first modulating electrodes is different from the second overlapping area formed between the common electrode and one of the second modulating electrodes from a top-view perspective. The ratio of the number of first modulating electrodes to the number of second modulating electrodes is in a range from 0.5 to 2.0.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
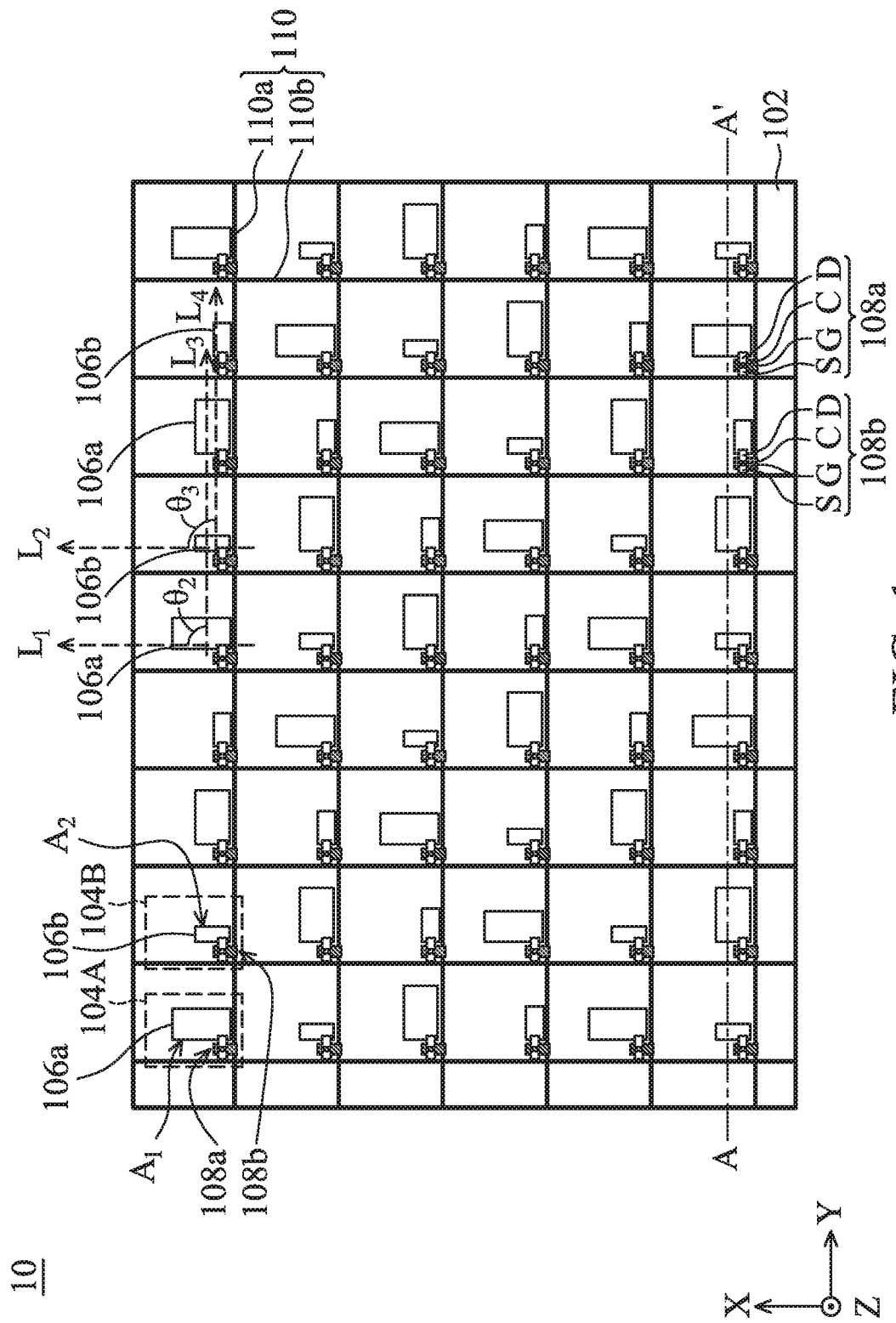
FIG. 1 illustrates a top-view diagram of an electronic modulating device in accordance with some embodiments of the present disclosure.

The electronic modulating device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. It should be noted that the elements or devices in the drawings of the present disclosure may be present in any form or configuration known to those with ordinary skill in the art. In addition, the expressions "a layer overlying another layer", "a layer is disposed above another layer". "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "about" and "substantially" typically mean+/−10% of the stated value, more typically mean+/−5% of the stated value, more typically+1-3% of the stated value, more typically+/−2% of the stated value, more typically+/−1% of the stated value and even more typically+/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected." refer to a relationship wherein structures are secured or attached to one another either directly or indirectly through intervening structures, as well as both movable or rigid attachments or relationships, unless expressly described otherwise.

In addition, the term "longitudinal direction" is defined as the direction along or parallel to the long axis of an object. The long axis is defined as a line extending through the center of an object lengthwise. For an elongated or oblong object, the long axis corresponds most nearly to its greatest dimension lengthwise. For an object that does not have a definite long axis, the long axis is referred to the long axis of a smallest rectangle that can encompass the object.

In addition, the phrase "in a range from a first value to a second value" indicates that the range includes the first value, the second value, and other values between them.

In accordance with some embodiments of the present disclosure, an electronic modulating device may include, but is not limited to, a display device (including a touch display device), a communication device, or a sensing device. In accordance with some embodiments, the electronic modulating device may be arranged in adjacency to form a tiled electronic device. Specifically, the display device may include, but is not limited to, a liquid-crystal display (LCD). In accordance with some embodiments, the communication device may include a liquid-crystal molecule-modulating device such as an antenna device.

FIG. 1 is a top-view diagram of an electronic modulating device 10 in accordance with some embodiments of the present disclosure. It should be understood that some of the components of the electronic modulating device 10 such as the top substrate, the supporting elements (e.g., shown in FIG. 11A) are omitted in FIG. 1 for clarity. In addition, it should be understood that additional features may be added to the electronic modulating device in accordance with some embodiments of the present disclosure.

Figure 11A:
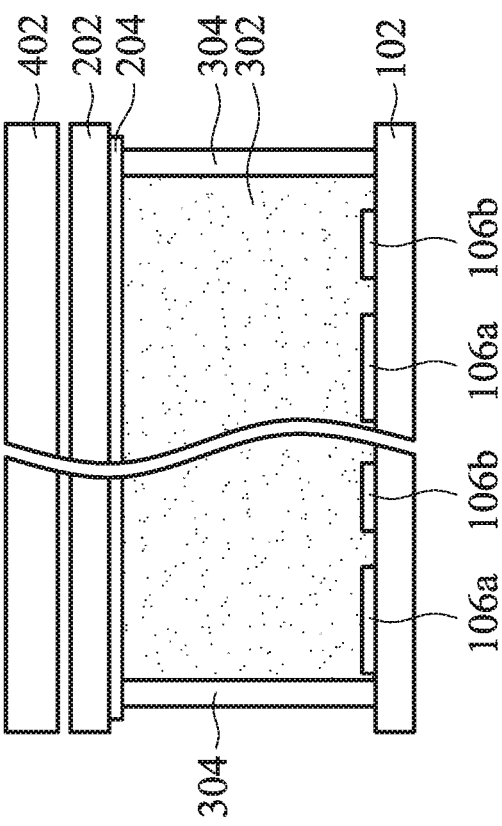
FIGS. 11A and 11B illustrate cross-sectional views of the electronic modulating device along line segment A-A' in FIG. 1 in accordance with some embodiments of the present disclosure.

Referring to FIG. 1, the electronic modulating device 10 may include a substrate 102. The electronic modulating device 10 may also include a substrate 202 (as shown in FIG. 11A) disposed opposite to the substrate 102. In some embodiments, the material of the substrate 102 and the material of the substrate 202 each may include, but is not limited to, glass, quartz, sapphire, silicon (Si), germanium (Ge), polycarbonate (PC), polyimide (PI), polyethylene terephthalate (PET), rubbers, glass fibers, other polymer materials, any other suitable substrate material, or a combination thereof.

The electronic modulating device 10 may further include a plurality of first modulating units 104A and a plurality of second modulating units 104B disposed on the substrate 102. The first modulating unit 104A may include a first modulating electrode 106a and a first driving element 108a, and the first modulating electrode 106a may be electrically connected to the first driving element 108a. The second modulating unit 104B may include a second modulating electrode 106b and a second driving element 108b, and the second modulating electrode 106b may be electrically connected to the second driving element 108b. In some examples, the first modulating electrode 106a and the second modulating electrode 106b may serve as pixel electrodes.

In addition, the materials of the first modulating electrode 106a and the second modulating electrode 106b may include conductive materials. In some embodiments, the conductive material may include, but are not limited to, copper, aluminum, molybdenum, tungsten, gold, chromium, nickel, platinum, titanium, silver, copper alloys, aluminum alloys, molybdenum alloys, tungsten alloys, gold alloys, chromium alloys, nickel alloys, platinum alloys, titanium alloys, silver alloys, any other suitable conductive materials (e.g. carbon nano-tubes), or a combination thereof. In some embodiments, the materials of the first modulating electrode 106a and the second modulating electrode 106b may include transparent conductive materials. For example, the transparent conductive material may include, but is not limited to, indium tin oxide (ITO), tin oxide (SnO), indium zinc oxide (IZO), indium gallium zinc oxide (IGZO), indium tin zinc oxide (ITZO), any other suitable transparent conductive materials, or a combination thereof. In some embodiments, the materials of the first modulating electrode 106a and the second modulating electrode 106b may include conductive polymers. For example, the conductive polymers include poly (3,4-ethylenedioxythiophene), polystyrene sulfonate (PEDOT:PSS), polythiophenes (PT), polypyrrole (PPY), or polyphenylene sulfide (PPS).

The electronic modulating device 10 may further include signal lines 110 disposed on the substrate 102. The signal lines 110 may be electrically connected to at least one of the first driving elements 108a and at least one of the second driving elements 108b. In addition, the signal lines 110 may be electrically connected to at least one of the first modulating electrodes 106a and at least one of the second modulating electrodes 106b. The first driving elements 108a and the second driving elements 108b may be used to control the voltages applied to the first modulating electrodes 106a and the second modulating electrodes 106b respectively.

The first driving elements 108a and the second driving elements 108b may include an active driving element, a passive driving element and/or a combination thereof. As shown in FIG. 1, at least one of the first driving elements 108a and the second driving elements 108b may be an active driving element such as a thin-film transistors (TFT) in accordance with some embodiments. More specifically, the first driving element 108a and the second driving element 108b each may include a source electrode S, a drain electrode D and a gate electrode G and a channel region C. The source electrode S and the drain electrode D may be disposed on opposite sides of the gate electrode G. The channel region C may be disposed between the source electrode S and the drain electrode D. In addition, the drain electrodes D of the first driving element 108a and the second driving element 108b may be electrically connected to the first modulating electrodes 106a and the second modulating electrodes 106b respectively.

In addition, the signal lines 110 may include data lines 110b and scan lines 110a in accordance with some embodiments, but the present disclosure is not limited thereto. The signal lines may include other conductive lines. The extending direction of at least one of the data lines 110b and the extending direction of at least one of the scan lines 110a may be different. For example, the data line 110b and the scan line 110a may be arranged substantially perpendicular to each other. The data line 110b and the scan line 110a may be electrically connected to the source electrode S and the gate electrode G of the first driving elements 108a respectively. Similarly, the data line 110b and the scan line 110a may be electrically connected to the source electrode S and the gate electrode G of the second driving elements 108b respectively.

It should be understood that although the first driving elements 108a and the second driving elements 108b are active driving elements in the embodiments illustrated in figures, the first driving elements 108a and the second driving elements 108b may be passive driving elements, which may be controlled by an IC or a microchip, in accordance with some other embodiments. Moreover, although each modulating electrode is controlled by one driving element in the embodiments illustrated in figures, more than one modulating electrodes may be controlled by the same driving element in accordance with some other embodiments.

In some embodiments, the area $A_1$ of the first modulating electrode 106a may be greater than the area $A_2$ of the second modulating electrode 106b in accordance with some embodiments. Specifically, the electronic modulating device 10 may include the modulating electrodes of different areas (e.g., the first modulating electrode 106a and the second modulating electrode 106b) so that the performance variation of the electronic modulating device 10 in different angles may be reduced in accordance with some embodiments. Moreover, the modulating electrodes with different areas may allow the electronic modulating device 10 to modulate the electromagnetic wave in different ranges of radio frequency in accordance with some embodiments. For example, the electronic modulating device 10 may modulate the electromagnetic wave of radio frequency in a range from about 1 G Hz to about 100 T Hz in accordance with some embodiments.

In some embodiments, the ratio of the area $A_1$ of the first modulating electrode 106a to the area $A_2$ of the second modulating electrode 106b may be in a range from about 1.2 to about 100, such as 2, 10, 40, or 80, or in a range from about 1.3 to about 50. If the ratio of the area $A_1$ of the first modulating electrode 106a to the area $A_2$ of the second modulating electrode 106b is too small (e.g., less than about 1.2), the performance variation of the electronic modulating device 10 in different angles may not be reduced effectively. On the other hand, if the ratio of the area $A_1$ of the first modulating electrode 106a to the area $A_2$ of the second modulating electrode 106b is too great (e.g., greater than about 100), the frequency difference of electromagnetic wave modulated by the electronic modulating device 10 may be too great to be applicable for its intended use.

Figure 2:
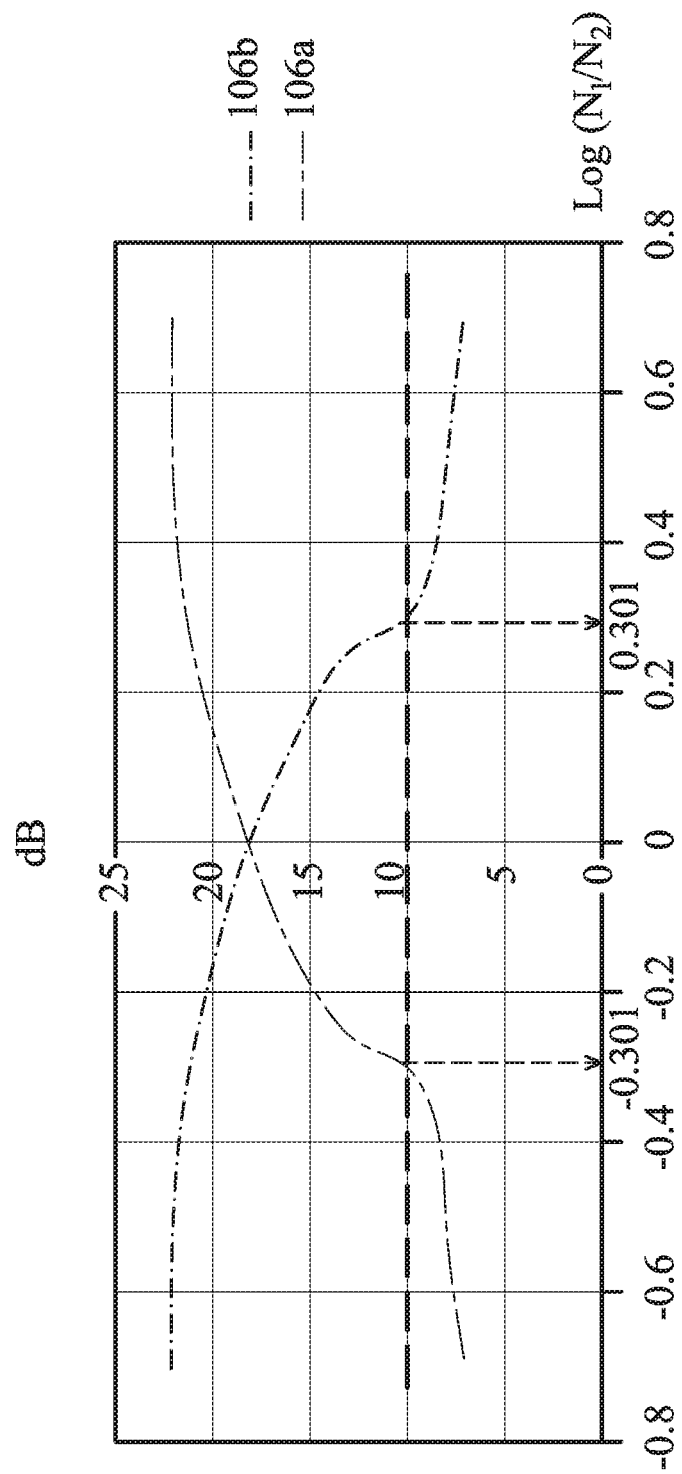
FIG. 2 illustrates a diagram showing the relationship between the ratio of the number of first modulating electrodes to the number of second modulating electrodes and the energy difference of the main lobe and the side lobe of a radiation pattern provided by the electronic modulating device in accordance with some embodiments of the present disclosure.

In addition, as shown in FIG. 1, the first modulating electrodes 106a and the second modulating electrodes 106b are arranged alternately in accordance with some embodiments. In other words, one of the first modulating electrodes 106a may be disposed between two of the second modulating electrodes 106b. In some examples, a portion of the first modulating electrodes 106a and a portion of the second modulating electrodes 106b may be alternately arranged while the other portion of the first modulating electrodes 106a and the other portion of the second modulating electrodes 106b are not. Moreover, the first modulating electrodes 106a and the second modulating electrodes 106b may correspond to two different radio frequencies respectively in accordance with some embodiments. In some embodiments, both of the first modulating electrodes 106a and the second modulating electrodes 106b may be designed to receive and/or transmit the electromagnetic wave. Furthermore, the electronic modulating device 10 includes $N_1$ first modulating electrodes 106a and $N_2$ second modulating electrodes 106b, wherein $N_1$ and $N_2$ are the numbers of the first modulating electrodes 106a and the second modulating electrodes 106b respectively, in accordance with some embodiments. That is, the numbers of the first modulating electrodes 106a and the second modulating electrodes 106b may be $N_1$ and $N_2$ respectively. Refer to FIG. 2, the X axis is referred to the logarithm value of the ratio of the $N_1$ first modulating electrodes 106a to the $N_2$ second modulating electrodes 106b (i.e. log $(N_1/N_2)$), and the Y axis is referred to the difference between the energy $E_1$ of a main lobe and the energy $E_2$ of a side lobe of a radiation pattern (i.e. $E_1$-$E_2$, and the unit is decibel (dB)).

As described above, the electronic modulating device 10 may provide a radiation pattern, and the radiation pattern includes a main lobe and a side lobe. In some embodiments, the difference between the energy $E_1$ of the main lobe and the energy $E_2$ of the side lobe of the radiation pattern is greater than or equal to 10 dB so that the electronic modulating device 10 may be applicable as an antenna device. In other words, the difference of gain level between the main lobe and the side lobe is greater than or equal to 10 dB in accordance with some embodiments.

In addition, the ratio of the number $N_1$ to the number $N_2$ is in a range from about 0.5 to about 2.0, such as 0.6, 1.0, 1.2 or 1.7, or in a range from about 0.75 to about 1.35 in accordance with some embodiments. As shown in FIG. 2, the logarithm value of the ratio of $N_1$ to $N_2$ may be maintained within a range (e.g., from about −0.301 to about 0.301, i.e. from about log ½ to about log 2) so that the difference of gain level between the main lobe and the side lobe can meet the requirement of being greater than or equal to 10 dB. Accordingly, the ratio of $N_1$ to $N_2$ may be maintained within a range from about 0.5 to about 2.0 so that the electronic modulating device 10 may be applicable as an antenna device.

Moreover, in accordance with some embodiments of the present disclosure, the number of the modulating electrodes (e.g., the first modulating electrodes 106a and/or 106b) may be referred to the number of the first modulating electrodes 106a or the second modulating electrodes 106b that are included in a square region having the side length of 20 centimeter (cm), 10 cm, or 5 cm. Specifically, the square region can be used as a basis for measurement for determination of the number of the first modulating electrodes 106a or the second modulating electrodes 106b. Moreover, when a first modulating electrode 106a or a second modulating electrode 106b is incomplete within the square region for measurement, the first modulating electrode 106a or the second modulating electrode 106b may not be counted in the number of first modulating electrodes 106a or second modulating electrodes 106b.

Figure 3:
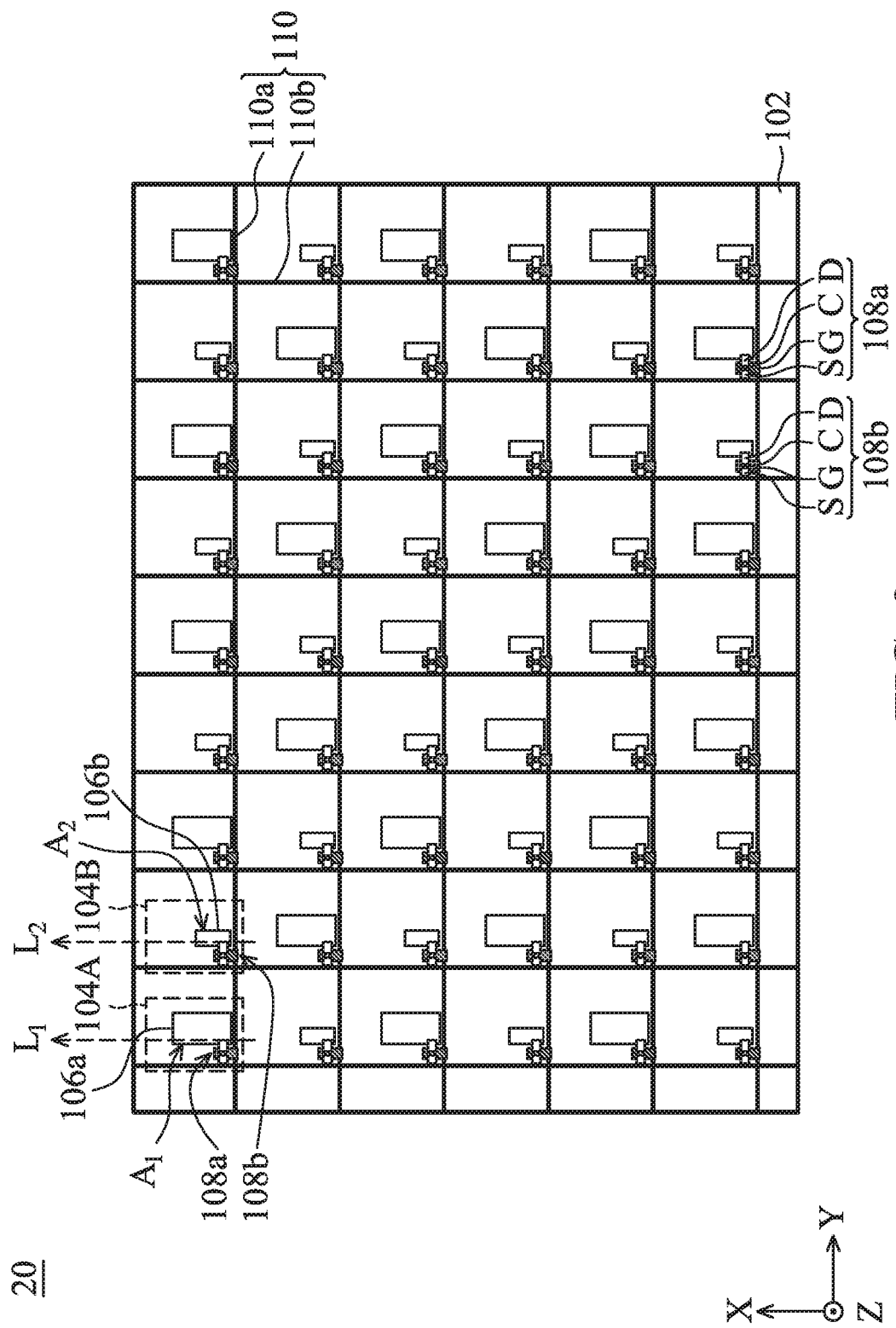
FIG. 3 illustrates a top-view diagram of an electronic modulating device in accordance with some embodiments of the present disclosure.

Next, refer to FIG. 3, which is a top-view diagram of an electronic modulating device 20 in accordance with some other embodiments of the present disclosure. In should be understood that the same or similar components or elements in the context of the descriptions provided above and below are represented by the same or similar reference numerals. The materials, manufacturing methods and functions of these components or elements are the same or similar to those described above, and thus will not be repeated herein. The electronic modulating device 20 is similar to the electronic modulating device 10 shown in FIG. 1. As shown in FIG. 3, the electronic modulating device 20 also includes a plurality of first modulating electrodes 106a and a plurality of second modulating electrodes 106b disposed on the substrate 102. As described above, the first modulating electrodes 106a and the second modulating electrodes 106b may be alternately arranged. In addition, the first modulating electrodes 106a and the second modulating electrodes 106b may be arranged to extend along the same or different directions. In some examples, the directions may be longitudinal directions of the first modulating electrodes 106a and the second modulating electrodes 106b.

Figure 4B:
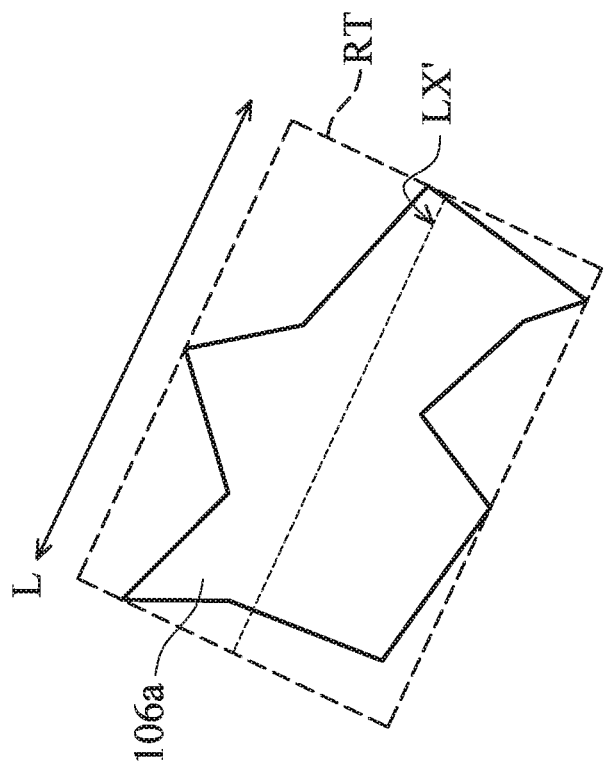
FIGS. 4A and 4B illustrate examples of the definition of the longitudinal direction of the modulating electrode in accordance with some embodiments of the present disclosure.
Figure 4A:
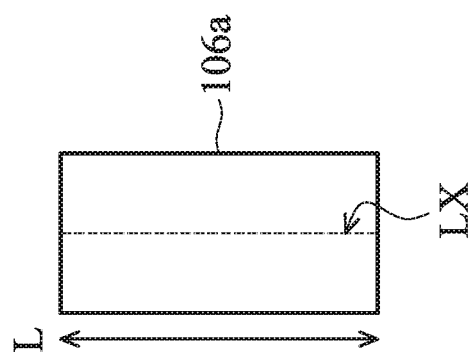

As describe in the above context, the term "longitudinal direction" is defined as the direction along or parallel to the long axis of an object. The long axis may be defined as a line extending through an object lengthwise. For an elongated or oblong object, the long axis may correspond to its greatest dimension lengthwise. For example, as shown in FIG. 4A, in the embodiments where the first modulating electrode 106a has a rectangular shape, the longitudinal direction L of the first modulating electrode 106a may be defined as the direction parallel to a long axis LX of the rectangle. For example, as shown in FIG. 4B, in the embodiments where the first modulating electrode 106a has an irregular shape, the longitudinal direction L of the first modulating electrode 106a may be defined as the direction that is parallel to a long axis LX' of a smallest rectangle RT that is virtual and can encircle the first modulating electrode 106a. In some embodiments, the smallest rectangle RT that can encircle the first modulating electrode 106a may be defined by using software such as OpenCV. Moreover, image binarization process may be performed on the image of the first modulating electrode 106a before the smallest rectangle RT is defined, in accordance with some embodiments.

Furthermore, in some other embodiments where the first modulating electrode 106a has a square shape, the longitudinal direction L of the first modulating electrode 106a may be defined as the direction that is parallel to a side of the square that forms a smaller included angle with the long axis of the drain electrode of the driving element. It should be understood that the above embodiments shown in FIGS. 4A and 4B take the first modulating electrode 106a as an example to explain the definition of longitudinal direction, and other modulating electrodes also can be defined in the same way.

Again, referring to FIG. 3, the first modulating electrodes 106a and the second modulating electrodes 106b may extend along the same or a similar longitudinal direction. Specifically, the first modulating electrodes 106a may extend along a first longitudinal direction $L_1$ and the second modulating electrodes 106b may extend along a second longitudinal direction $L_2$. In this embodiment, the first longitudinal direction $L_1$ is substantially the same as the second longitudinal direction $L_2$. In some other embodiments, the first longitudinal direction $L_1$ may be different from the second longitudinal direction $L_2$. For example, an angle $\theta_1$ (not illustrated) between the first longitudinal direction $L_1$ and the second longitudinal direction $L_2$ may be in a range from about 5 degrees to about 175 degrees in accordance with some embodiments. In some embodiments, the angle $\theta_1$ (not illustrated) between the first longitudinal direction $L_1$ and the second longitudinal direction $L_2$ may include, but is not limited to, 15 degrees, 30 degrees, 45 degrees, 60 degrees, 75 degrees, 90 degrees, 105 degrees, 130 degrees, 145 degrees, or 160 degrees.

In addition, the first modulating electrodes 106a may all extend along the same or a similar longitudinal direction. For example, in this embodiment, the first modulating electrodes 106a all extend along the first longitudinal direction $L_1$. Similarly, the second modulating electrodes 106b may all extend along the same or a similar longitudinal direction (e.g., the second longitudinal direction $L_2$). However, in some other embodiments, not all of the first modulating electrodes 106a extend along the same or a similar longitudinal direction. In some embodiments, some of the first modulating electrodes 106a extend along the same longitudinal direction while some of the first modulating electrodes 106a extend along different longitudinal direction(s). For example, as shown in the embodiments in FIG. 1, some of the first modulating electrodes 106a extend along the first longitudinal direction $L_1$, while some of the first modulating electrodes 106a extend along a third longitudinal direction $L_3$, and the first longitudinal direction $L_1$ is different from the third longitudinal direction $L_3$. For example, an angle $\theta_2$ between the first longitudinal direction $L_1$ and the third longitudinal direction $L_3$ may be in a range from about 5 degrees to about 175 degrees in accordance with some embodiments. In some embodiments, the angle $\theta_2$ between the first longitudinal direction $L_1$ and the third longitudinal l direction $L_3$ may include, but is not limited to, 15 degrees, 30 degrees, 45 degrees, 60 degrees, 75 degrees, 90 degrees, 105 degrees, 130 degrees, 145 degrees, or 160 degrees. Moreover, it should be understood that although the first modulating electrodes 106a extend along two different longitudinal directions as illustrated in FIG. 1, the first modulating electrodes 106a may extend along more than two directions in accordance with some other embodiments.

Similarly, in some embodiments, not all of the second modulating electrodes 106b extend along the same or a similar longitudinal direction. In some embodiments, some of the second modulating electrodes 106b extend along the same longitudinal direction while some of the second modulating electrodes 106b extend along different longitudinal direction(s). For example, as shown in the embodiments in FIG. 1, some of the second modulating electrodes 106b extend along the second longitudinal direction $L_2$, while some of the second modulating electrodes 106b extend along a fourth longitudinal direction $L_4$, and the second longitudinal direction $L_2$ is different from the fourth longitudinal direction $L_4$. For example, an angle $θ_3$ between the second longitudinal direction $L_2$ and the fourth longitudinal direction $L_4$ may be in a range from about 5 degrees to about 175 degrees in accordance with some embodiments. In some embodiments, the angle $θ_3$ between the second longitudinal direction $L_2$ and the fourth longitudinal direction $L_4$ may include, but is not limited to, 15 degrees, 30 degrees, 45 degrees, 60 degrees, 75 degrees, 90 degrees, 105 degrees, 130 degrees, 145 degrees, or 160 degrees. Moreover, it should be understood that although the second modulating electrodes 106b extend along two different longitudinal directions as illustrated in FIG. 1, the second modulating electrodes 106b may extend along more than two directions in accordance with some other embodiments.

Figure 5:
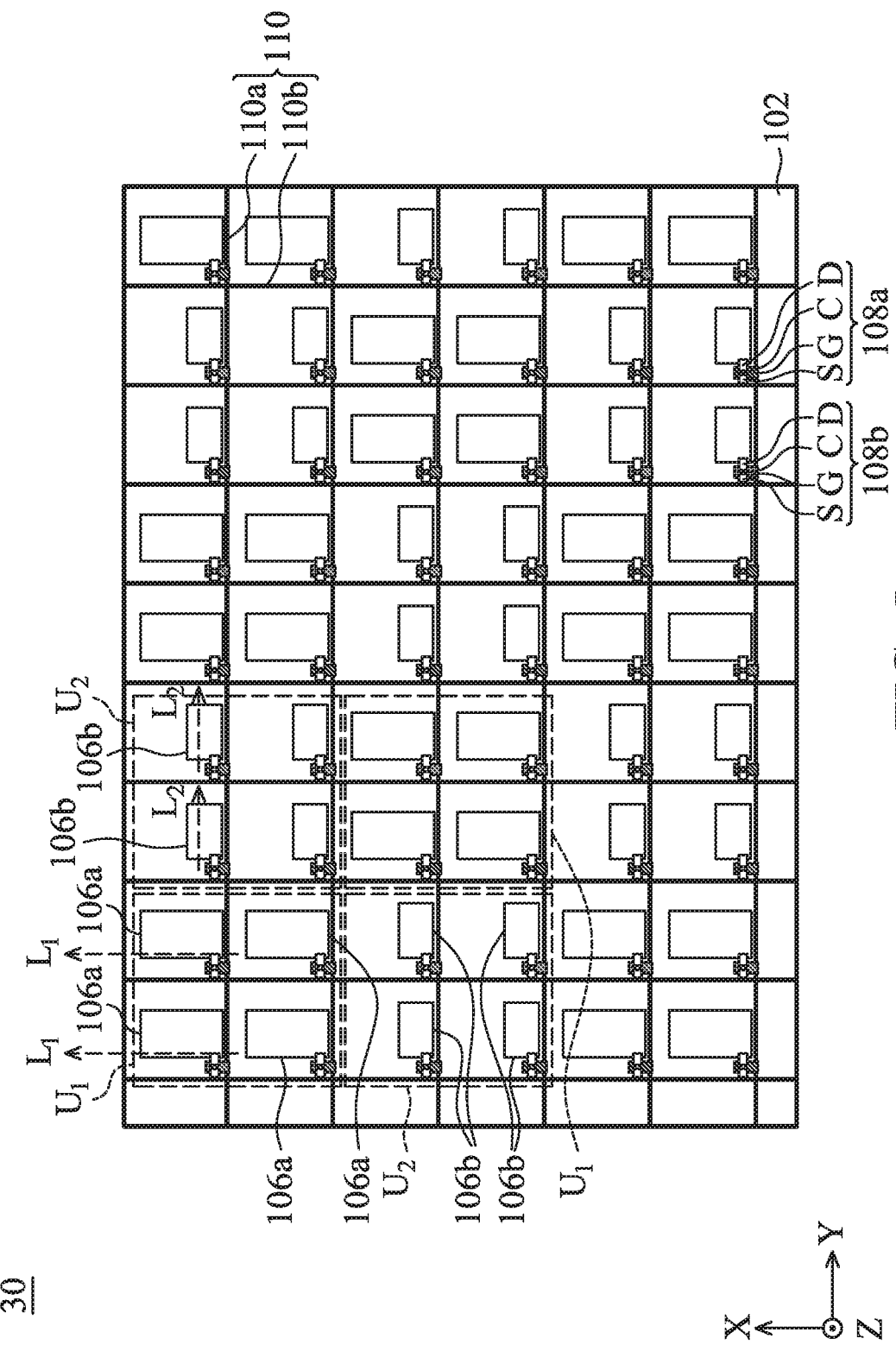
FIG. 5 illustrates a top-view diagram of an electronic modulating device in accordance with some embodiments of the present disclosure.

Next, refer to FIG. 5, which is a top-view diagram of an electronic modulating device 30 in accordance with some other embodiments of the present disclosure. As shown in FIG. 5, the electronic modulating device 30 also includes a plurality of first modulating electrodes 106a and a plurality of second modulating electrodes 106b disposed on the substrate 102. As described above, the first modulating electrodes 106a and the second modulating electrodes 106b may be alternately arranged. In this embodiment, four first modulating electrodes 106a may be considered as a first unit $U_1$, and four second modulating electrodes 106b may be considered as a second unit $U_2$. The first unit $U_1$ and the second unit $U_2$ may alternate in their arrangement. In this embodiment, the first modulating electrodes 106a all extend along the first longitudinal direction $L_1$, and the second modulating electrodes 106b all extend along the second longitudinal direction $L_2$. Moreover, the first longitudinal direction $L_1$ is different from the second longitudinal direction $L_2$. In some examples, the first unit $U_1$ may include m first modulating electrodes 106a, and the second unit $U_2$ may include n second modulating electrodes 106b, wherein m and n are positive integers. In examples, m may be the same as or different from n.

Figure 6:
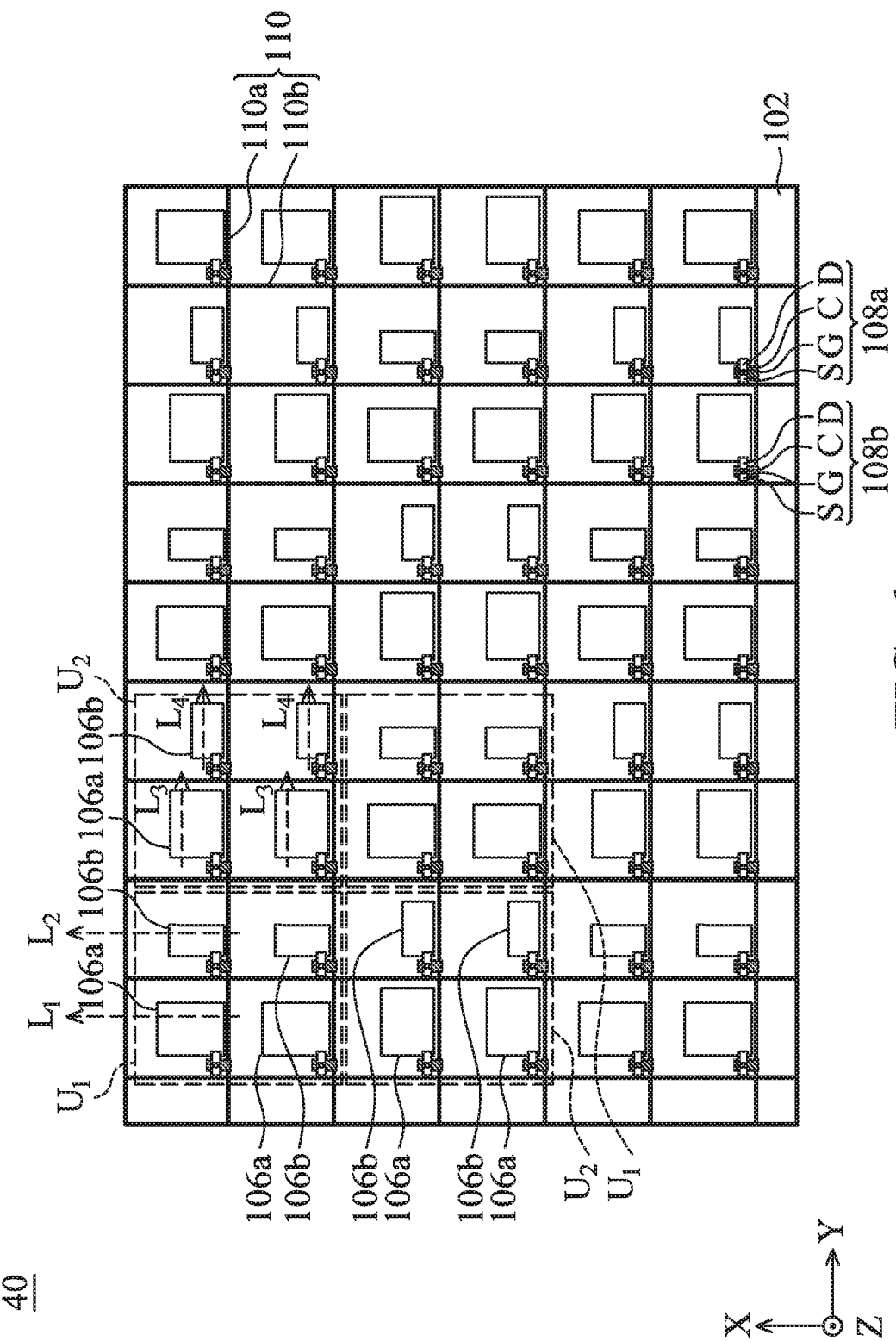
FIG. 6 illustrates a top-view diagram of an electronic modulating device in accordance with some embodiments of the present disclosure.

Next, refer to FIG. 6, which is a top-view diagram of an electronic modulating device 40 in accordance with some other embodiments of the present disclosure. In this embodiment, two first modulating electrodes 106a and two second modulating electrodes 106b may be considered as a first unit $U_1$ or a second unit $U_2$. In this embodiment, two first modulating electrodes 106a and two second modulating electrodes 106b of the first unit $U_1$ or a second unit $U_2$ extend along the same longitudinal direction. More specifically, in this embodiment, the first unit $U_1$ includes two first modulating electrodes 106a extending along the first longitudinal direction $L_1$ and two second modulating electrodes 106b extending along the second longitudinal direction $L_2$, while the first longitudinal direction $L_1$ is substantially the same as the second longitudinal direction $L_2$. The second unit $U_2$ includes two first modulating electrodes 106a extending along the third longitudinal direction $L_3$ and two second modulating electrodes 106b extending along the fourth longitudinal direction $L_4$, while the third longitudinal direction $L_3$ is substantially the same as the fourth longitudinal direction $L_4$. In addition, the third longitudinal direction $L_3$ is different from the first longitudinal direction $L_1$. The fourth longitudinal direction $L_4$ is different from the second longitudinal direction $L_2$. Similarly, in this embodiment, the first unit $U_1$ and the second unit $U_2$ may be alternately arranged. In some examples, the first longitudinal direction $L_1$ may be different from the second longitudinal direction $L_2$. The third longitudinal direction $L_3$ may be different from the fourth longitudinal direction $L_4$. The angle between any two of the first longitudinal direction $L_1$, the second longitudinal direction $L_2$, the third longitudinal direction $L_3$ and the fourth longitudinal direction $L_4$ may be in a range from about 5 degrees to about 175 degrees, such as 30 degrees, 60 degrees, or 120 degrees.

Figure 7:
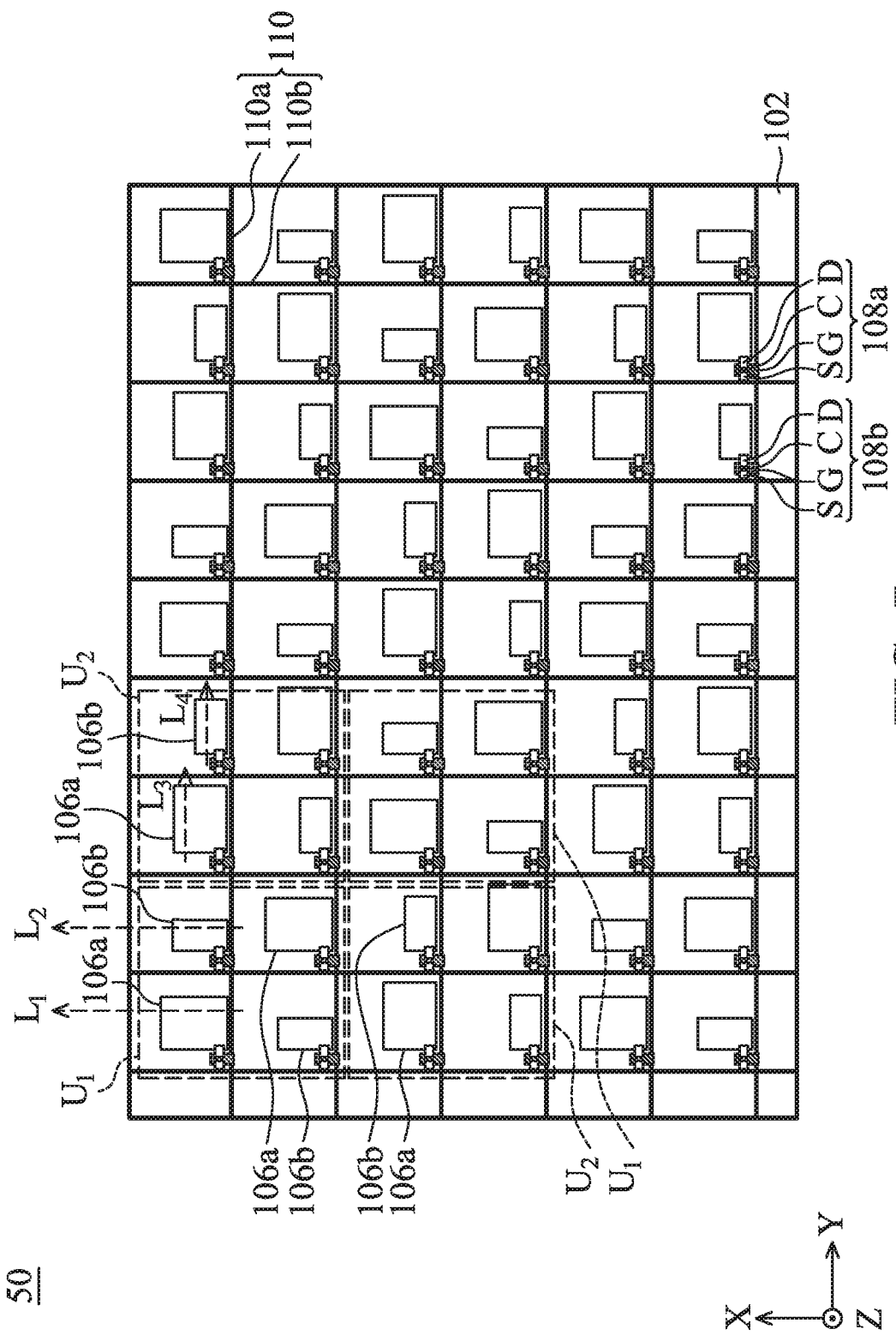
FIG. 7 illustrates a top-view diagram of an electronic modulating device in accordance with some embodiments of the present disclosure.

Next, refer to FIG. 7, which is a top-view diagram of an electronic modulating device 50 in accordance with some other embodiments of the present disclosure. The electronic modulating device 50 shown in FIG. 7 is similar to the electronic modulating device 40 shown in FIG. 6. The difference between the electronic modulating device 50 and the electronic modulating device 40 is that the modulating electrodes of the first unit $U_1$ and/or the second unit $U_2$ are arranged in different manners. Specifically, one first modulating electrode 106a is disposed between two second modulating electrodes 106b in the Y direction and/or the X direction. It should be understood that although both the first unit $U_1$ and the second unit $U_2$ as described in the above embodiments include four modulating electrodes, the number of modulating electrodes of the unit can be adjusted according to need in some other embodiments. In addition, the arrangement of the first modulating electrodes 106a and one second modulating electrodes 106b of the unit can be adjusted according to need in some other embodiments.

Figure 8:
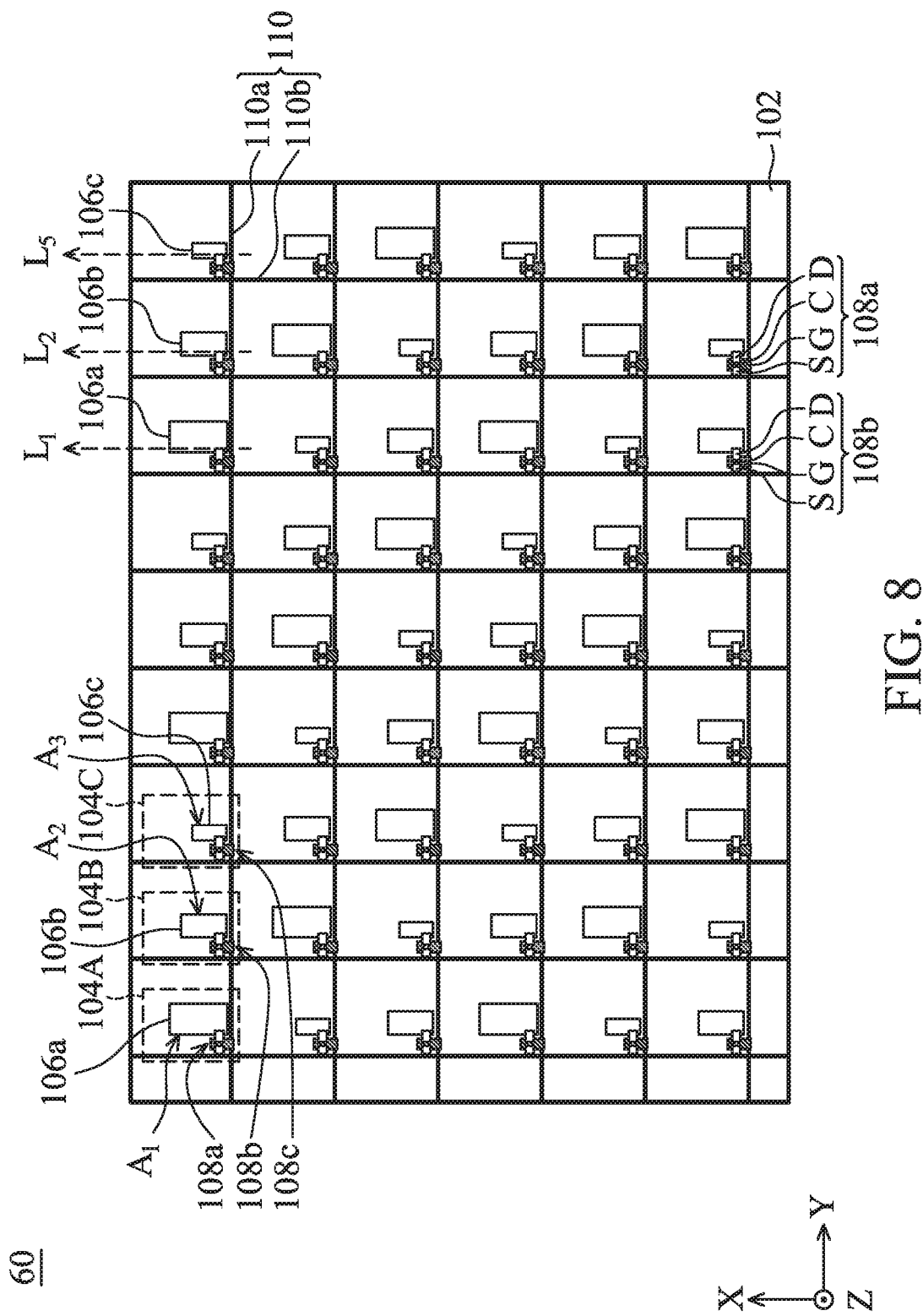
FIG. 8 illustrates a top-view diagram of an electronic modulating device in accordance with some embodiments of the present disclosure.

Next, refer to FIG. 8, which is a top-view diagram of an electronic modulating device 60 in accordance with some other embodiments of the present disclosure. The electronic modulating device 60 also includes a plurality of first modulating units 104A and a plurality of second modulating units 104B disposed on the substrate 102. Moreover, the electronic modulating device 60 further includes a plurality of third modulating units 104C disposed on the substrate 102. As shown in FIG. 8, the third modulating units 104C includes a third modulating electrode 106c and a third driving element 108c, and the third modulating electrode 106c may be electrically connected to the third driving element 108c. Moreover, the third driving element 108c may be electrically connected to the signal line 110. In addition, at least a portion of the first modulating electrodes 106a, the second modulating electrodes 106b and the third modulating electrodes 106c may be alternately arranged in accordance with some embodiments.

In some embodiments, the area $A_3$ of the third modulating electrode 106c is less than at least one of the area $A_1$ of the first modulating electrode 106a and the area $A_2$ of the first modulating electrode 106b. In some embodiments, the ratio of the area $A_1$ of the first modulating electrode 106a to the area $A_3$ of the third modulating electrode 106c is in a range from about 1.2 to about 100, such as 5, 20, 50 or 80. In other words, the ratio of the area of the modulating electrode having the greatest dimension to the area of the modulating electrode having the smallest dimension is in a range from about 1.2 to about 100.

Furthermore, the electronic modulating device 60 includes $N_1$ first modulating electrodes 106a, $N_2$ second modulating electrodes 106b and $N_3$ third modulating electrode 106c in accordance with some embodiments. In some embodiments, the ratio of $N_1$ first modulating electrodes 106a to $N_3$ third modulating electrodes 106c (i.e. $N_1/N_3$) is in a range from about 0.5 to about 2.0, such as 1.2 or 1.5.

Figure 9:
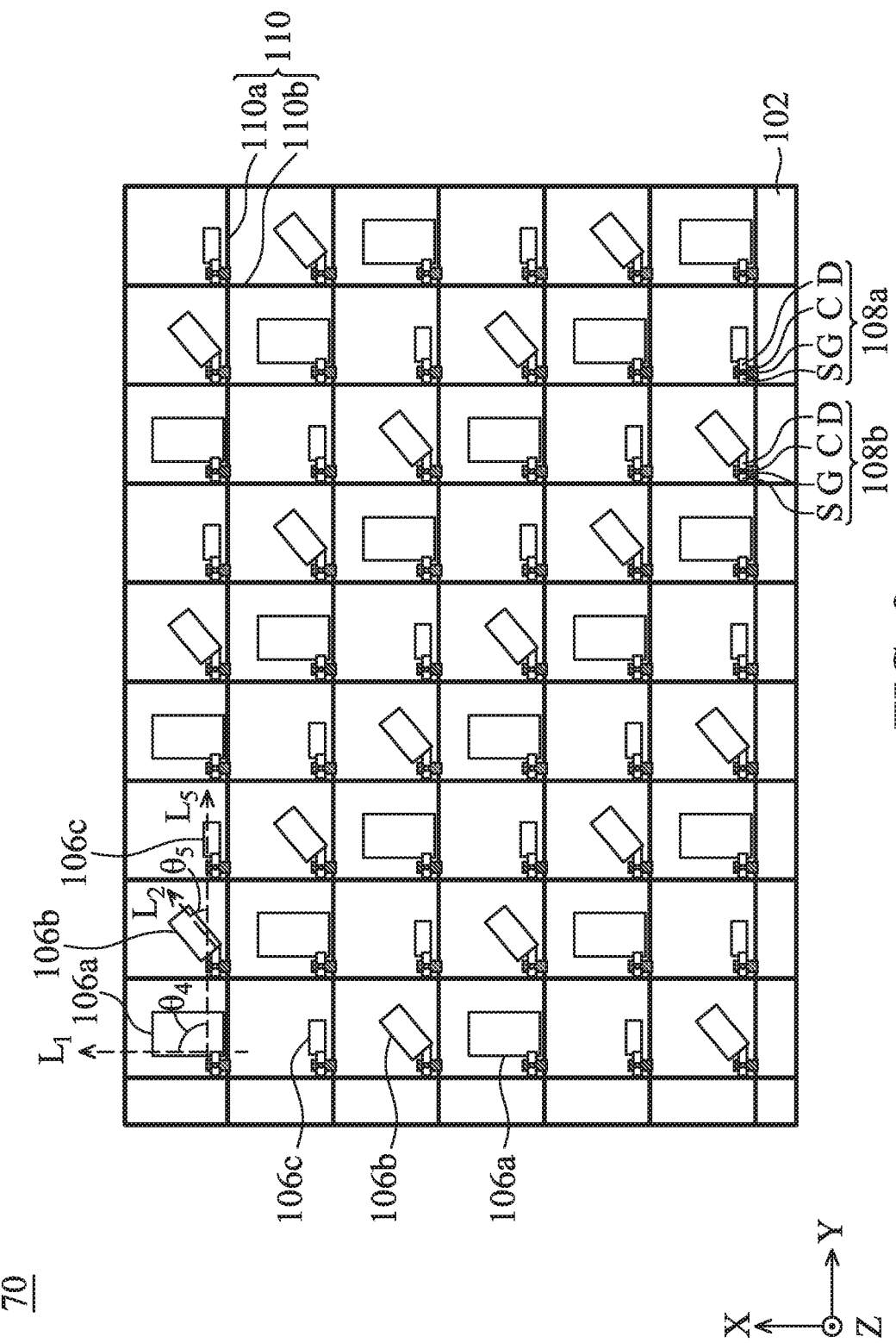
FIG. 9 illustrates a top-view diagram of an electronic modulating device in accordance with some embodiments of the present disclosure.

Next, refer to FIG. 9, which is a top-view diagram of an electronic modulating device 70 in accordance with some other embodiments of the present disclosure. The electronic modulating device 70 shown in FIG. 9 is similar to the electronic modulating device 60 shown in FIG. 8. The difference between electronic modulating device 70 and electronic modulating device 60 is that the first modulating electrode 106a, the second modulating electrode 106b and the third modulating electrode 106c extend along different longitudinal directions in electronic modulating device 70.

Specifically, the first modulating electrode 106a extends along the first longitudinal direction $L_1$, the second modulating electrode 106b extends along the second longitudinal direction $L_2$, and the third modulating electrode 106c extends along a fifth longitudinal direction $L_5$. In this embodiment, the first longitudinal direction $L_1$, the second longitudinal direction $L_2$, and the fifth longitudinal direction $L_5$ are different from one another. In some other embodiments, the first longitudinal direction $L_1$, the second longitudinal direction $L_2$, and the fifth longitudinal direction $L_5$ may be substantially the same (as shown in FIG. 8). In some other embodiments, two of the first longitudinal direction $L_1$, the second longitudinal direction $L_2$ and the fifth longitudinal direction $L_5$ may be substantially the same while one of them may be different from the other two.

In some embodiments, an angle $\theta_4$ between the fifth longitudinal direction $L_5$ and the first longitudinal direction $L_1$ may be in a range from about 5 degrees to about 175 degrees. In some embodiments, an angle $\theta_5$ between the fifth longitudinal direction $L_5$ and the second longitudinal direction $L_2$ may be in a range from about 5 degrees to about 175 degrees. In some embodiments, the angle $\theta_4$ and the angle $\theta_5$ each may include, but is not limited to, 15 degrees, 30 degrees, 45 degrees, 60 degrees, 75 degrees, 90 degrees, 105 degrees, 130 degrees, 145 degrees, or 160 degrees. In addition, the third modulating electrodes 106c may all extend along substantially the same or a similar longitudinal direction in accordance with some embodiments. For example, in this embodiment, the third modulating electrodes 106c all extend along the fifth longitudinal direction $L_5$. However, in some other embodiments, not all of the third modulating electrodes 106c extend along the same or a similar longitudinal direction. In some embodiments, some of the third modulating electrodes 106c extend along substantially the same longitudinal direction while some of the third modulating electrodes 106c extend along different longitudinal direction(s).

Furthermore, it should be understood that although the electronic modulating devices illustrated in the above embodiments include two or three kinds of modulating electrodes having different areas, the electronic modulating device may include the modulating electrodes with more than three sizes in accordance with some other embodiments. In some embodiments, the electronic modulating device may include the modulating electrodes with any suitable types of sizes according to the need.

Figure 10:
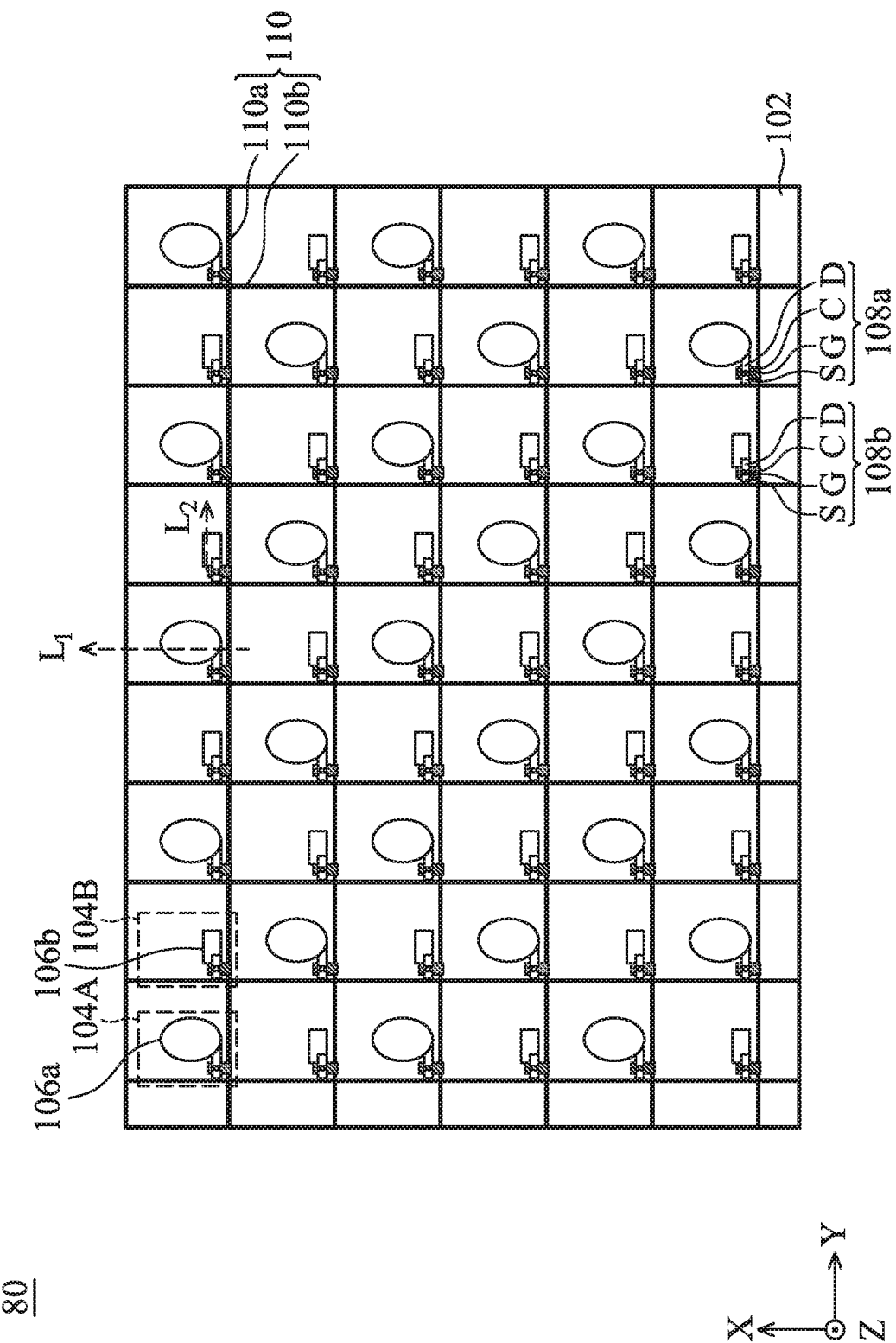
FIG. 10 illustrates a top-view diagram of an electronic modulating device in accordance with some embodiments of the present disclosure.

Next, refer to FIG. 10, which is a top-view diagram of an electronic modulating device 80 in accordance with some other embodiments of the present disclosure. The electronic modulating device 80 shown in FIG. 10 is similar to the electronic modulating device 20 shown in FIG. 3. The difference between electronic modulating device 80 and electronic modulating device 20 is that the first modulating electrodes 106a have oblong shapes in electronic modulating device 80 while the second modulating electrodes 106b have a rectangular shape in electronic modulating device 20. In some other embodiments, the first modulating electrodes 106a and the second modulating electrodes 106b may have a triangle shape, a pentagonal shape, an oblong shape, a diamond shape, an irregular shape, any other suitable shape or a combination thereof. In addition, the first modulating electrodes 106a and the second modulating electrodes 106b may have the same shape in accordance with some embodiments. The first modulating electrodes 106a and the second modulating electrodes 106b may have different shapes in accordance with some embodiments. Moreover, the plurality of first modulating electrodes 106a may have substantially the same or different shapes, and the plurality of second modulating electrodes 106b may also have substantially the same or different shapes.

Figure 11B:
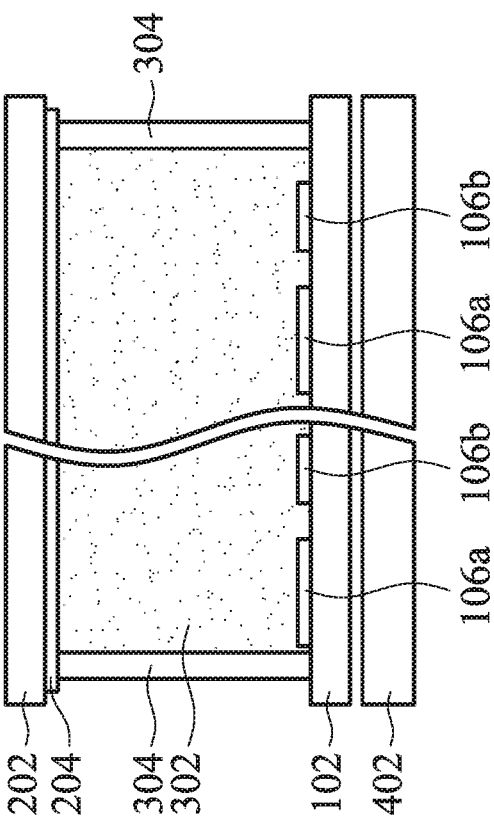

Next, refer to FIGS. 11A and 11B, which are cross-sectional views of the electronic modulating device 10 along line segment A-A' in FIG. 1 in accordance with some embodiments of the present disclosure. Some of the components such as the signal lines 110 etc. are omitted in FIGS. 11A and 11B to specify the structure of electronic modulating device 10. As shown in FIGS. 11A and 11B, the electronic modulating device 10 may include the substrate 102 and another substrate 202 disposed opposite to the substrate 102. The electronic modulating device 10 may include the first modulating electrodes 106a and the second modulating electrodes 106b disposed on the substrate 102.

The electronic modulating device 10 may further include a common electrode 204 disposed between the substrate 102 and the substrate 202. The common electrode 204 may be disposed on the first modulating electrodes 106a and the second modulating electrodes 106b. The common electrode 204 may also be electrically connected to the driving elements. The material of the common electrode 204 may be similar to the material(s) of the first modulating electrode 106a and/or the second modulating electrode 106b.

The electronic modulating device 10 may further include a modulating layer 302 disposed between the substrate 102 and the substrate 202. In some embodiments, the material of the modulating layer 302 may include, but is not limited to, liquid-crystal material, a microelectromechanical system (MEMS), other suitable modulating materials, or a combination thereof. FIG. 11A are 11B are only for example, and thus the actual structure of the electronic modulating device 10 may be different from the illustration but still within the scope of the present disclosure.

In addition, the electronic modulating device 10 may further include supporting elements 304 disposed between the substrate 102 and the substrate 202. The modulating material 302 may be enclosed or surrounded by supporting elements 304. The supporting elements 304 may be used to reinforce or fix the structure of the electronic modulating device 10. In some embodiments, the supporting element 304 may include a spacer, a sealant, or a combination thereof. The material of the supporting element 304 may include an insulating material, a conductive material, or other suitable materials. In some examples, the conductive material may include, but is not limited to, copper, silver, gold, copper alloys, silver alloys, gold alloys, or a combination thereof. In other examples, the insulating material may include, but is not limited to, polyethylene terephthalate (PET), polyethylene (PE), polyethersulfone (PES), polycarbonate (PC), polymethylmethacrylate (PMMA), glass, any other suitable materials, or a combination thereof.

In addition, the electronic modulating device 10 may further include a backlight unit 402 disposed on one side of the substrate 102. Specifically, the backlight unit 402 may be disposed adjacent to the substrate 102 (as shown in FIG. 11A) or adjacent to the substrate 202 (as shown in FIG. 11B). In some embodiments, the backlight unit 402 may include, but is not limited to, organic light-emitting diodes (OLED), mini light-emitting diodes (mini LED), micro light-emitting diodes (micro LED), quantum dot light-emitting diodes (QLED), quantum dots (QD), phosphors, fluorescence or other display elements, and it is not limited thereto. In addition, the electronic modulating device 10 may further include polarizing structures disposed adjacent to the substrate 102 and the substrate 202 respectively, in accordance with some embodiments. Furthermore, in some embodiments, the electronic modulating device 10 may further include a color conversion layer disposed between the substrate 102 and the modulating material 302, or between the substrate 202 and the modulating material 302. In some embodiments, the electronic modulating device 10 may further include a light-shielding element disposed adjacent to color conversion layer. In accordance with some embodiments, the electronic modulating device 10 may serve as a liquid-crystal display.

Figure 12B:
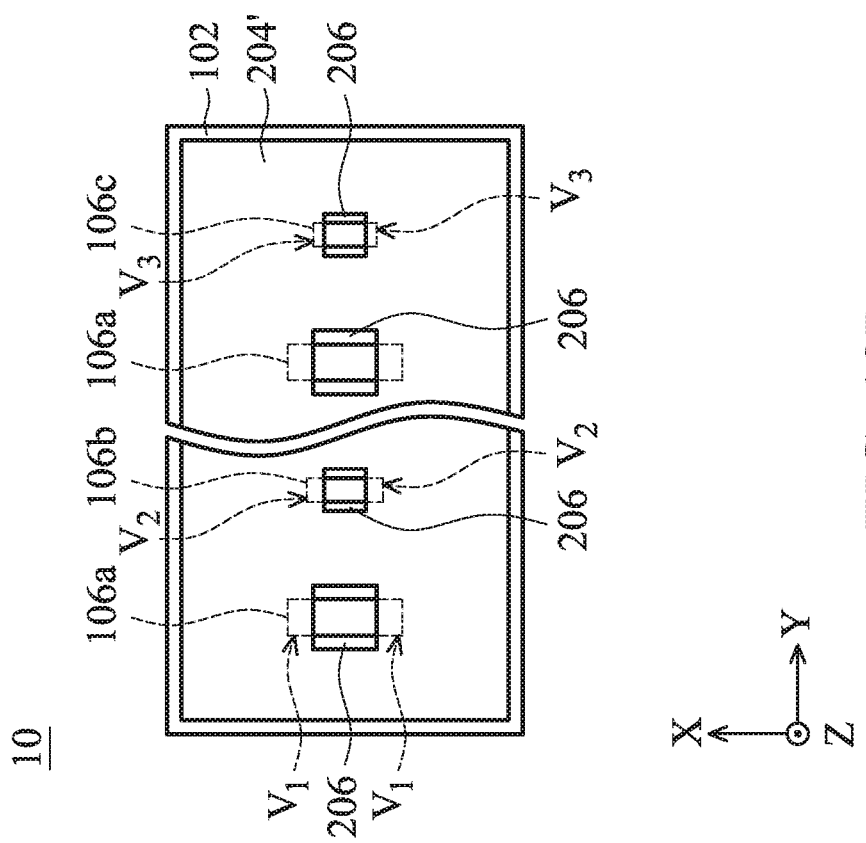
FIG. 12B illustrates a top-view diagram of the electronic modulating device shown in FIG. 12A in accordance with some other embodiments of the present disclosure.
Figure 12A:
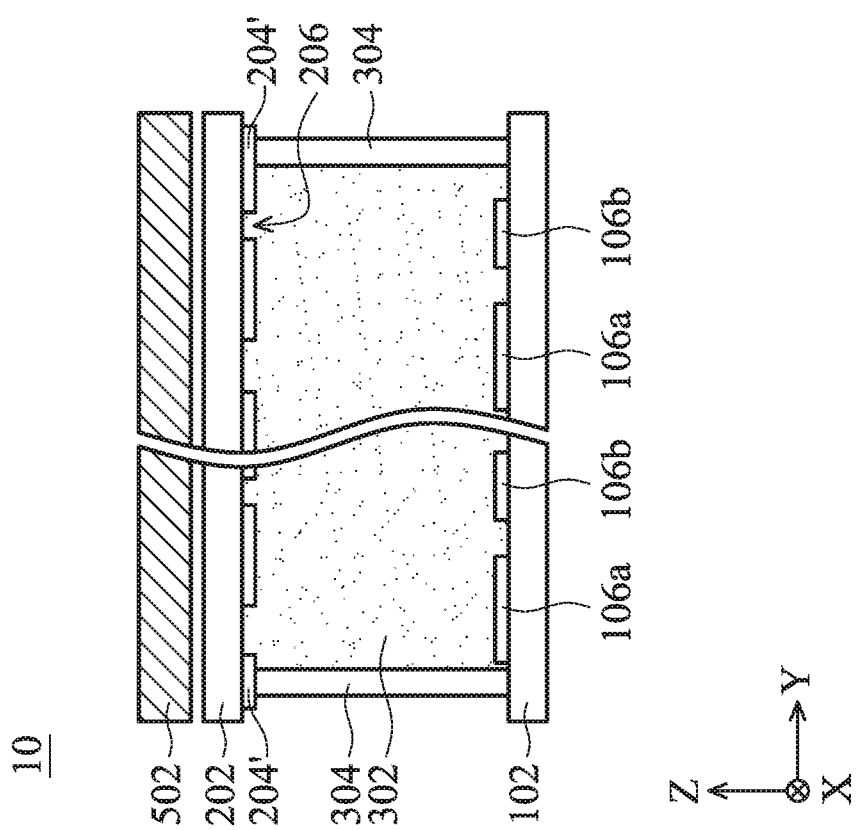
FIG. 12A illustrates a cross-sectional view of the electronic modulating device along line segment A-A' in FIG. 1 in accordance with some other embodiments of the present disclosure.

Next, refer to FIG. 12A, which is a cross-sectional view of the electronic modulating device 10 along line segment A-A' in FIG. 1 in accordance with some other embodiments of the present disclosure. Some of the components such as the signal lines 110 etc. are omitted in FIG. 12A to specify the structure of the electronic modulating device 10. The configuration of electronic modulating device 10 in the embodiment shown in FIG. 12A is similar to electronic modulating device 10 in the embodiment shown in FIG. 11B. The difference between them is that the common electrode 204' is patterned, and the backlight unit 402 is replaced by a waveguide 502 in the electronic modulating device 10 shown in FIG. 12A.

More specifically, the common electrode 204' may be patterned so that the common electrode 204' may include openings 206 formed therein. In some embodiments, the first modulating electrode 106a or the second modulating electrode 106b may be disposed corresponding to the opening 206. In some other embodiments, the common electrode 204' may have a ring structure.

In one example, the waveguide 502 may be disposed adjacent to the substrate 202. In other examples, the waveguide 502 may be disposed above the substrate 202. The common electrode 204' may be disposed between the waveguide 502 and the first modulating electrodes 106a. The waveguide 502 may provide or receive a wave for the electronic modulating device 10 in accordance with some embodiments. In accordance with some embodiments, the electronic modulating device 10 may serve as a liquid-crystal antenna.

Next, refer to FIG. 12B, which is a top-view diagram of the electronic modulating device 10 shown in FIG. 12A in accordance with some other embodiments of the present disclosure. Some of the components such as the substrate 202, the modulating material 302 etc. are omitted in FIG. 12B for clarity. As shown in FIG. 12B, a first overlapping area $V_1$ may be formed between the common electrode 204' and the first modulating electrode 106a from the top-view perspective. Similarly, a second overlapping area $V_2$ may be formed between the common electrode 204' and the second modulating electrode 106b from the top-view perspective. In some embodiments, the first overlapping area $V_1$ is different from the second overlapping area $V_2$. In some examples, the ratio of first overlapping area $V_1$ to second overlapping area $V_2$ is in a range from about 1.2 to about 100, such as 1.5, 10, 30, or 70, or in a range from about 1.3 to about 50 in accordance with some embodiments.

As described above, the electronic modulating device 10 may further include third modulating electrodes 106c disposed on the substrate 102 in accordance with some embodiments. In these embodiments, a third overlapping area $V_3$ (as shown in FIG. 12B) may also be formed between the common electrode 204' and the third modulating electrode 106c from the top-view perspective. In some embodiments, the third overlapping area $V_3$ is different from the first overlapping area $V_1$. In some examples, the ratio of first overlapping area $V_1$ to third overlapping area $V_3$ is in a range from about 1.2 to about 100, or in a range from about 1.3 to about 50 in accordance with some embodiments.

In accordance with some embodiments of the present disclosure, the present disclosure provides an electronic modulating device that includes modulating electrodes that have different areas. The ratio of the number of modulating electrodes of different areas may be kept within a range so that the electronic modulating device can modulate the electromagnetic wave with different radio frequency ranges. In addition, the modulating electrodes having different areas may extend along different directions in accordance with some embodiments of the present disclosure. Therefore, the performance of the electronic modulating device can be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic modulating device, comprising:
a substrate;
a plurality of first modulating electrodes disposed on the substrate; and
a plurality of second modulating electrodes disposed on the substrate, and an area of one of the plurality of first modulating electrodes being greater than an area of one of the plurality of second modulating electrodes;
wherein a ratio of a number of the plurality of first modulating electrodes to a number of the plurality of second modulating electrodes is in a range from 0.5 to 2.0.

2. The electronic modulating device as claimed in claim 1, wherein a portion of the plurality of first modulating electrodes and a portion of the plurality of second modulating electrodes are arranged alternately.

3. The electronic modulating device as claimed in claim 1, wherein a ratio of the area of one of the plurality of first modulating electrodes to the area of one of the plurality of second modulating electrodes is in a range from 1.2 to 100.

4. The electronic modulating device as claimed in claim 1, wherein a radiation pattern is provided by the electronic modulating device, the radiation pattern comprises a main lobe and a side lobe, and a difference of gain level between the main lobe and the side lobe is greater than or equal to 10 dB.

5. The electronic modulating device as claimed in claim 1, further comprising a signal line disposed on the substrate, wherein the signal line is electrically connected with at least one of the plurality of first modulating electrodes and at least one of the plurality of second modulating electrodes.

6. The electronic modulating device as claimed in claim 1, further comprising a common electrode disposed opposite to the plurality of first modulating electrodes and the plurality of second modulating electrodes.

7. The electronic modulating device as claimed in claim 6, wherein the common electrode is patterned.

8. The electronic modulating device as claimed in claim 7, further comprising a waveguide, and the common electrode is disposed between the waveguide and the plurality of first modulating electrodes.

9. The electronic modulating device as claimed in claim 1, wherein a shape of one of the plurality of first modulating electrodes is different from a shape of one of the plurality of second modulating electrodes.

10. The electronic modulating device as claimed in claim 1, wherein one of the plurality of first modulating electrodes extends along a first longitudinal direction, one of the plurality of second modulating electrodes extends along a second longitudinal direction, and the first longitudinal direction is different from the second longitudinal direction.

11. The electronic modulating device as claimed in claim 10, wherein an angle between the first longitudinal direction and the second longitudinal direction is be in a range from about 5 degrees to about 175 degrees.

12. The electronic modulating device as claimed in claim 1, wherein one of the plurality of first modulating electrodes extends along a first longitudinal direction, wherein another one of the plurality of first modulating electrodes extends along a third longitudinal direction, and the first longitudinal direction is different from the third longitudinal direction.

13. The electronic modulating device as claimed in claim 1, further comprising a plurality of third modulating electrodes disposed on the substrate, wherein an area of one of the plurality of third modulating electrodes is smaller than the area of one of the plurality of second modulating electrodes, and a ratio of the number of the plurality of second modulating electrodes to a number of the plurality of third modulating electrodes is in a range from 0.5 to 2.0.

* * * * *